Patented Aug. 6, 1935

2,010,436

UNITED STATES PATENT OFFICE 2,010,436

PROCESS OF COLORING EMULSIONS AND PRODUCTS THEREOF

John A. E. McClave, Grantwood, and Dudley H. Grant, Watchung, N. J., assignors to Stanco Incorporated, a corporation of Delaware No Drawing. Application February 26, 1932, Serial No. 595,422

10 Claims. (Cl. 167—91)

In the manufacture and sale of emulsions, especially cosmetic and pharmaceutical emulsions, both liquid and solid, considerable difficulty is often experienced owing to separation ("breaking") of the emulsion, which thereby becomes unsightly, even if its virtues be unimpaired. Especially in the case of colored or tinted emulsions, the separation of a clear or partly clear layer from an opaque emulsion results in a striking contrast between the apparent depth of color in the two layers, the clear layer appearing to be much more deeply colored than the opaque emulsion, even though the two layers may contain nearly the same actual amount of coloring matter per unit volume. In another case, providing the coloring matter is dissolved in the phase which remains dispersed, the emulsion layer will remain properly tinted, whereas the separated clear layer will be nearly colorless, again producing an unsightly appearance. An extreme case would be that of an oil and water emulsion containing a coloring matter soluble only in oil or in water, respectively, and which breaks into three layers: supernatant oil, unchanged emulsion and clear water beneath. If the color were, for example, an oil-soluble red, this preparation would then present the appearance of a deep red oil on top, a pink emulsion in the middle and clear colorless water beneath. Even when it is practicable easily to remix the emulsion, as by simple shaking, the consumer is apt to believe that the sharp contrast in colors implies an irremediable separation or segregation of active ingredients.

In the case of solid emulsions such as emulsion gels, cosmetic creams, cold cream, cleansing cream, vanishing cream, tissue cream, etc., the problem is aggravated by the usual impracticability of easy remixing. Such creams often suffer a superficial separation, not seriously impairing their value, but rendering them unattractive to the eye. A cold cream composed of oil and waxes emulsified with water by the aid of borax or soap, and colored pink with oil-soluble color, for example, may, after protracted storage on the dealer's shelf, acquire a superficial layer of oil or of oil-wax gel, due to separation or to evaporation of water. This superficial layer, being transparent or translucent, appears deep red in comparison with the unaltered underlying emulsion, even though little, if any, actual concentration of coloring matter has taken place.

We have found that these untoward phenomena may be largely mitigated by using as coloring agents for such emulsions a plurality of coloring matters including both colors soluble in the continuous phase of the emulsion and colors soluble in the disperse phase. Assuming, for purposes of explanation, that the two phases of the emulsion are oil and water, we would choose an oil-soluble color or mixture of colors and a water-soluble color or mixture of colors of as nearly the same hue as possible (not excluding the use of different hues for special effects) and dissolve them in the respective solvents before emulsification. The finished emulsion presents an appearance similar to that of an emulsion made by the customary means (i. e., by the addition of color to only one of the two phases), but on long storage or exposure to heat the advantages of our process become manifest, in that incipient separation of the phases is far less noticeable, since the color of the separated layer is nearly the same as that of the unaltered emulsion.

Since the relative apparent depth of color of the separated layer or layers, as compared with the unaltered emulsion, is determined not only by the character and concentration of the coloring matter but also by the transparency, translucency or opacity of the respective layers, it is usually necessary to adjust the relative concentrations of coloring matter in the two phases to such a ratio as will equalize the resultant apparent colors of the layers after separation. Supposing, for example, that the separated layer of homogeneous oil-wax gel, on top of a jar of cold cream which has suffered partial separation, is twice as translucent or half as opaque as the unaltered cream, its apparent color (at equal content of coloring matter per unit volume) will be about twice as great. It is therefore necessary to employ only half as much coloring matter per unit volume, on the basis of equivalent tinctorial powers in the colors used, in the oil-wax phase of the emulsion as in the aqueous phase. If this be done (the exact ratio being determined by experiment), the difference in appearance between the original cream and the separated layer is minimized, which is the desideratum of our invention.

The following examples will illustrate our process and compositions:

1. Emulsion of liquid petrolatum

| | |
|---|---|
| Petrolatum liquidum, U. S. P. | 1 pint |
| Gum acacia, powdered | 4 ounces |
| Gum tragacanth, powdered | ½ ounce |
| Distilled water | 13 fl. oz. |
| Alkannin (an oil soluble vegetable dye of red color) | 3 grains |
| Amaranth (certified food color, a water soluble coal tar dye of red color) | ½ grain |

Dissolve the alkannin in the oil and the amaranth in the water. Moisten the powdered gums with the oil and add this mixture to the water gradually, with thorough agitation. Flavor to taste if so desired.

2. Cold cream

| | |
|---|---|
| Beeswax | 1½ lbs. |
| Ceresin | 1 lb. |
| Petrolatum liquidum, U. S. P. | 1 gal. |
| Borax, U. S. P. | 4 oz. |
| Distilled water | ½ gal. |
| Sudan IV (oil-soluble red dye), specially purified | ½ grain |
| Liquor carmini, N. F. (red animal dye made water soluble) | ⅓ fl. oz. |

The borax is dissolved in the water and the liquor carmini is added. The beeswax, paraffin wax, liquid petrolatum are mixed at 160° F. and the Sudan IV is added to the solution obtained. The aqueous solution is then heated to 160° F. and added to the petrolatum solution with thorough agitation. The resulting emulsion is of pink color.

It is to be understood that the expression "oil-soluble" coloring matter is meant to designate a coloring matter soluble or colloidally soluble in oil. The expression "water-soluble" coloring matter is used in a similarly broad sense.

Our invention is not to be limited by the examples given for illustration but only by the appended claims in which it is our intention to claim all novelty inherent in our process and compositions.

What we claim is:

1. Process of coloring an emulsion which comprises adding both a color soluble in the continuous phase and a color soluble in the disperse phase of the emulsion.

2. Process of coloring an emulsion composed of an oily phase and an aqueous phase which comprises adding both an oil-soluble coloring matter and a water-soluble coloring matter.

3. Process of coloring an emulsion composed of an oily phase and an aqueous phase which comprises adding such proportions of oil-soluble and water-soluble coloring matters as will impart a similar apparent depth of color to both phases after the emulsion separates.

4. Process of coloring an emulsion composed of an oily phase and an aqueous phase which comprises adding before emulsification such proportions of oil-soluble and water-soluble coloring matters as will minimize the apparent difference in color between the unaltered emulsion and either or both phases which may subsequently separate therefrom.

5. Process of coloring a solid or semi-solid cosmetic cream which comprises adding before emulsification both oil-soluble and water-soluble colors in such relative amounts as will minimize the difference between the apparent colors of the intact cream and of the superficial oily layer which forms on protracted storage of the cream.

6. A composition of matter comprising an emulsion containing both a color soluble in the continuous phase and a color soluble in the disperse phase.

7. As a composition of matter an emulsion comprising an oily phase containing an oil-soluble coloring matter and an aqueous phase containing a water-soluble coloring matter.

8. As a composition of matter an emulsion comprising an oily phase containing an oil-soluble coloring matter and an aqueous phase containing a water-soluble coloring matter, the oil-soluble and the water-soluble coloring matters being present in such relative proportion that they impart a similar apparent depth of color to both phases after the emulsion separates.

9. As a composition of matter an emulsion comprising an oily phase containing an oil-soluble coloring matter and an aqueous phase containing a water-soluble coloring matter, the oil-soluble and the water-soluble coloring matters being present in such relative proportion that they impart a similar apparent depth of color to the unaltered emulsion and either or both phases which may subsequently separate therefrom.

10. As a composition of matter a cosmetic cream comprising an oily phase containing an oil-soluble coloring matter and an aqueous phase containing a water-soluble coloring matter, the two coloring matters being present in such relative proportion as will minimize the difference between the apparent colors of the intact cream and of the superficial oily layer which forms on protracted storage of the cream.

JOHN A. E. McCLAVE.
DUDLEY H. GRANT.